United States Patent [19]
Lieber et al.

[11] Patent Number: 5,997,832
[45] Date of Patent: Dec. 7, 1999

[54] PREPARATION OF CARBIDE NANORODS

[75] Inventors: Charles M. Lieber, Lexington; Eric Wong, Cambridge, both of Mass.

[73] Assignee: President and Fellows of Harvard College, Cambridge, Mass.

[21] Appl. No.: 08/814,745

[22] Filed: Mar. 7, 1997

[51] Int. Cl.$^6$ .................................................. C01B 31/30
[52] U.S. Cl. ..................... 423/249; 423/263; 423/345; 423/346; 423/439; 423/440
[58] Field of Search .................... 423/439, 440, 423/345, 346, 263, 249; 427/228; 501/88, 92

[56] References Cited

U.S. PATENT DOCUMENTS

| | | | |
|---|---|---|---|
| 3,246,950 | 4/1966 | Gruber | 23/208 |
| 3,447,952 | 6/1969 | Hertl | 117/106 |
| 4,756,791 | 7/1988 | D'Angelo et al. | 156/610 |
| 4,900,525 | 2/1990 | D'Angelo et al. | 422/245 |
| 4,904,622 | 2/1990 | Dubots et al. | 501/888 |
| 4,948,573 | 8/1990 | Nadkarni et al. | 423/291 |
| 4,988,564 | 1/1991 | D'Angelo et al. | 428/368 |
| 5,141,773 | 8/1992 | Gilbert et al. | 427/228 |
| 5,221,526 | 6/1993 | Qi et al. | 423/345 |
| 5,244,609 | 9/1993 | Ishiyama | 264/29.5 |

FOREIGN PATENT DOCUMENTS

| | | |
|---|---|---|
| 0 400 656 A1 | 5/1990 | European Pat. Off. . |
| 0 582 435 A1 | 2/1994 | European Pat. Off. . |
| 0 603 888 A2 | 6/1994 | European Pat. Off. . |
| 2-175698 | 7/1990 | Japan . |
| 5-221799 | 8/1993 | Japan . |
| WO 89/07163 | 8/1989 | WIPO . |
| WO 96/30570 | 10/1996 | WIPO . |

OTHER PUBLICATIONS

Bhat et al., "An Examination Of The Growth Models For TIC Whiskers Made By CVD", *Materials & Manufacturing Processes* 7(4), 613–625 (1992) no month.

Ebbesen et al., "Large–scale Synthesis of Carbon Nanotubes", *Nature* 358, 220–222 (1992) Jul.

Hamilton et al., "Preparation of Amorphous Boron Nitride and Its Conversion to a Turbostratic, Tubular Form", *Science* 260, 659–661 (1993) Apr.

Iijima, "Helical Microtubules of Graphitic Carbon", *Nature* 354, 56–58 (1991) no month.

Lieber et al., "Growth And Structure Of Carbide Nanorods", Materials Research Society, Symposium Proceedings vol. 410, 103–111 (1995) Nov.

McMahon et al., "On The Growth Mechanism of Silicon Carbide Whiskers", *Journal of Materials Science* 26, 5655–5663 (1991) no month.

Ruoff et al., "Single Crystal Metals Encapsulated In Carbon Nanoparticles", *Science* 259, 346–348 (1993) Jan.

Stephan et al., "Doping Graphitic and Carbon Nanotube Structures with Boron and Nitrogen", *Science* 266, 1683–1685 (1994) Dec.

Weng–Sieh et al., "Synthesis of $B_xC_yN_z$ nanotubeles", *Physical Review B*, vol. 51, Apr. 1995.

Wokulski et al., "On The Growth And Morphology of $TiC_x$ Whiskers", *Journal of Crystal Growth* 62, 439–446 (1983) no month.

Zhou et al., "Production of Silicon Carbide Whiskers From Carbon Nanoclusters", *Chemical Physical Letters* 222, 233–238 (1994) no month.

*Primary Examiner*—Steven P. Griffin
*Assistant Examiner*—Stuart L. Hendrickson
*Attorney, Agent, or Firm*—Fish & Richardson P.C.

[57] ABSTRACT

A process utilizing a supported metal catalyst, a volatile species source, and a carbon source has been developed to produce carbide nanorods with diameters of less than about 100 nm and aspect ratios of 10 to 1000. The volatile species source, carbon source, and supported metal catalyst can be used to produce carbide nanorods in single run, batch, and continuous reactors under relatively mild conditions. The method employs a simple catalytic process involving readily available starting materials.

41 Claims, No Drawings

PREPARATION OF CARBIDE NANORODS

STATEMENT AS TO FEDERALLY SPONSORED RESEARCH

This invention was made with support from the National Science Foundation (MERSEC, Grant No. DMR-9400396) and the Department of Navy (Grant No. N00014-94-1-0302). Accordingly, the U.S. government may have certain rights in the invention.

BACKGROUND OF THE INVENTION

The invention relates to methods of preparing rod-like nanometer scale carbide materials.

Examples of rod-like nanometer scale carbide materials (hereafter termed "nanorods") having diameters less than 100 nm and aspect ratios from 10 to 1000 have been reported. The carbide nanorods are physically distinct from rod-like carbide materials termed "whiskers" that have solid crystalline structures with diameters generally between 1 and 100 microns, although diameters as small as 0.1 micron have been observed. The small diameters of carbide nanorods lead to enhanced properties relative to larger-sized whisker materials.

Methods for preparing SiC and other carbide nanorods involve reaction between a volatile main-group (e.g., Si, B) or metal (e.g., Ti, Fe, W) species and a carbon nanotube which serves as a template for the growth of corresponding carbide nanorods (e.g., SiC, TiC). This method can also be used to prepare carbide whisker materials having diameters between 200 and 400 nm. The method provides carbide nanorods on a small scale (i.e., laboratory scale), but is difficult to scale up due to the expense and limited availability of the carbon nanotubes.

The most widely used commercial method used for producing SiC whiskers involves carbothermal reduction of silica ($SiO_2$) with rice hulls. There are other methods reported for the growth SiC whiskers that involve "seeding" elements, such as the rare earths, Group IA, Group IB, Group VB, Group VIB, Group VIIB, and Group VIII of the Periodic Table of Elements, to facilitate production of whiskers. See, for example, Qi, et al., U.S. Pat. No. 5,221,526. Similar metal catalysts have been used in the preparation of carbon fibrils. See, for example, Snyder, et al., WO 89/07163.

SUMMARY OF THE INVENTION

The invention features methods for making carbide nanorods. In one aspect, the invention features a method of producing a carbide nanorod. The carbide nanorod has an aspect ratio of between 10 and 1000 and a shorter axis of between 1 and 40 nanometers. The method includes providing a volatile species source, a carbon source, and a supported metal catalyst in a furnace and heating the volatile species source, the carbon source, and the supported metal catalyst to form the nanorod.

In another aspect, the invention features a method of producing silicon carbide nanorods. The method includes placing a volatile species source including silicon in a furnace; providing a carbon source and a supported metal catalyst in the furnace; generating a vapor including silicon in the furnace by heating the metal source to a temperature between 500° C. and 2500° C. to form silicon carbide nanorods; and collecting the silicon carbide nanorods thus formed.

The volatile species source, carbon source, and supported metal catalyst are heated to a temperature between 500° C. and 2500° C., more preferably between 900° C. and 1500° C. A gas (e.g., an inert gas such as Ar) can flow through the through the furnace during the nanorod formation. Alternatively, the providing step includes placing the metal source, the carbon source and the supported metal catalyst in a tube and sealing the tube. The tube is evacuated to a pressure of less than one atmosphere (e.g., less than 0.1 atm, preferably less than $1 \times 10^{-2}$ torr) before sealing.

The carbide includes titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, zinc, aluminum, copper, germanium, or a combination thereof. The carbide includes an element provided by the volatile species source and carbon provided by the carbon source. In certain embodiments, the carbide can include nitrogen, boron, or phosphorus.

The volatile species source can include titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, nitrogen, boron, phosphorus, zinc, aluminum, copper, germanium, or a combination thereof. Preferred volatile species source include titanium, silicon, niobium, iron, boron, tungsten, molybdenum, gadolinium, or a combination thereof. The volatile species source can further include iodine.

In preferred embodiments, the volatile species source includes silicon. The silicon can be in the form of $SiO_2$, Si, a siloxane polymer, or $SiR_mX_{4-m}$ where m is 0, 1, 2, or 3, R is hydrogen, alkyl, aryl, alkoxy, or alkyl amino, and X is Cl, Br, F, I, or H. The alkyl, aryl, alkoxy, or alkyl amino groups have twenty carbons or less and can be branched or unbranched. The alkyl amino group can be a monoalkyl or dialkyl amino group. Alternatively, the alkyl amino group can include an aryl substituent.

The carbon source can include carbon black, amorphous carbon, graphite, a carbon-based polymer, a fullerene, or a $C_1$ to $C_{20}$ hydrocarbon. The hydrocarbon can be branched or straight-chain hydrocarbons and can include unsaturated or aromatic groups. The preferred carbon source is graphite. The supported metal catalyst and the carbon source can be mixed together.

The supported metal catalyst is a carrier coated with a metal catalyst. Preferably, the carrier is inert under the conditions of forming the nanorod. For example, the carrier can be fumed alumina ($Al_2O_3$). The metal catalyst can include lithium, sodium, potassium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, a lanthanide series element, or a combination thereof. Preferred metal catalysts include molybdenum, iron, cobalt, nickel, manganese, or a combination thereof. In certain embodiments, metal catalyst is a mixture of molybdenum and iron in a molar ratio of Mo:Fe between 99:1 and 1:99, preferably between about 10:1 and 1:10.

The method represents a low-cost approach for producing carbide nanorods that can be carried out on a large scale. The method is an improvement over methods that require use of pre-formed carbon nanotubes, which are a high-cost specialty item, as a critical reactant to form carbide nanorods. The method eliminates the need to use nanotubes in the process by employing a metal catalyst.

The carbide nanorods have useful metallic, semiconducting, insulating, superconducting, or magnetic properties, or combinations thereof. The dimensions of the nanorods permit the building of nanostructures and metallic, ceramic, and polymer composites that exhibit superior strength and toughness compared with composites made with whiskers. Carbide nanorods have an increased surface-to-volume ratio relative to carbide whiskers, which improves their mechanical strength (e.g., tensile strength). For example, the tensile strength ($kg/mm^2$) of a nanorods is greater than that of a corresponding whisker having the same composition. Some nanorods have a lower density of stacking faults normalized to diameter than larger-sized materials (i.e. whiskers), as determined by TEM. For example, SiC nanorods disclosed herein have a lower density of stacking faults than the SiC whiskers as described by G. McMahon et al., *J. Mater. Sci.* 26:5655–5663 (1991).

As used herein, the term "nanorod" means a space-filling article with an aspect ratio of at least 10 (e.g., at least 50, at least 100, or at least 500). In general, the aspect ratio is between 25 and 1000, (e.g., between 100 and 1000, between 50 and 500, between 100 and 500, or between 500 and 1000). The aspect ratio is the ratio of the length to the short axis. As used herein, the term "short axis" is equivalent to "diameter," meaning the shortest dimension or cross-sectional thickness of a nanorod. A nanorod has a short axis (or diameter) of between 1 and 100 nm (e.g., between 1 and 40 nm, and preferably between 2 and 30 nm). As used herein, the term "length" means a longitudinal dimension of the nanorod that is orthogonal to the diameter of the nanorod. In other words, the length of a nanorod is between 0.02 and 50 microns, and preferably between 0.5 and 25 microns.

The carbide nanorods are solid, being neither hollow with one or two open ends, nor hollow with two sealed ends. The nanorods can have single crystal, irregular crystalline (i.e., polycrystalline) or amorphous forms. The nanorods can be substantially straight, wavy, curved, corrugated, or helical in shape. Where a nanorod is, e.g., helical, curved, or networked, the diameter is always measured across the thickness of the rod, and not the overall diameter of the helix, curve, or network, which is generally much greater than the diameter of the nanorod. Length is not the overall size of a helix or overlapping network, which, if made of only one nanorod, is generally shorter than the length of the nanorod. If a helix or network is made of more than one nanorod, the length of a nanorod may be larger or smaller than the overall length of the helix or network.

Preferably, the diameter of a nanorod is substantially the same along the length of the nanorod. Most preferably, the nanorod is substantially straight.

As used herein, the term "carbide" means a compound of carbon and one or more elements more electropositive than carbon, excluding hydrogen. A carbide article includes carbon and an element selected from the group consisting of titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, zinc, aluminum, copper, germanium, cadmium, indium, tin, lead, or thallium. Preferably, the element is selected from the group consisting of titanium, silicon, niobium, iron, boron, tungsten, molybdenum, or gadolinium. Most preferably, the element is titanium or silicon. The molar ratio of carbon to the element can be between 0.1 and 2.1 (e.g., between 0.9 and 1.1). The carbide can further include boron, nitrogen, or phosphorus.

The carbide can be a binary or ternary carbide. Examples of binary carbides include $TiC_x$, $NbC_x$, and $SiC_x$ (wherein x is between 0.5 and 1.1), $Fe_3C_x$ (wherein x is between 0.8 and 1.2), and $BC_x$ (wherein x is between 0.1 and 0.3). Additional examples of binary carbides include $ZrC_x$, $HfC_x$, $VC_x$, $TaC_x$, $CrC_x$, $MoC_x$, $WC_x$, $NiC_x$, $LaC_x$, $CeC_x$, $PrC_x$, $NdC_x$, $SmC_x$, $GdC_x$, $DyC_x$, $HoC_x$, $ErC_x$, and $YbC_x$. Examples of ternary carbides include carbonitrides, carboborides, and carbosilicides and others such as $TiN_yC_x$, $MoN_yC_x$, and $SiN_yC_x$, $TiB_yC_x$, $TiTa_yC_x$, $TiSi_yC_x$, $TiNb_yC_x$, $MoSi_yC_x$, $MoB_yC_x$, $MoGa_yC_x$, $MoAl_yC_x$, $FeB_yC_x$, $FeSi_yC_x$, $FeNi_yC_x$, $SiB_yC_x$, $TaSi_yC_x$, $WSi_yC_x$, $ZrSi_yC_x$, $NbSi_yC_x$, $CrSi_yC_x$, $NdB_yC_x$, and $WCo_yC_x$. The values of x and y are, respectively, between 0.1 and 2.1 and between 0 and 0.9. Where y is 0, the carbide is a binary carbide consisting essentially of carbon and one other element. Where y is greater than 0 (e.g., between 0.1 and 0.9), the carbide is a ternary carbide consisting essentially of carbon and two other elements. The elements are derived from a volatile species.

There can be additives in or on the carbide lattice material such as oxygen (up to 10%), halogen (up to 2%), silicon (up to 5%), tellurium (up to 1%), and $sp^2$ hybridized carbon (up to 5%). The sources of these additives are typically the reactants (pure metals or nonmetals, metal or nonmetal oxides, transport molecules, and transport agents) used in forming volatile metal or nonmetal species.

Other features or advantages of the present invention will be apparent from the following detailed description of the invention, and also from the claims.

DETAILED DESCRIPTION

A process utilizing a supported metal catalyst (i.e., a metal catalyst coated on a support), volatile species source (e.g., silicon), and a carbon source has been developed to produce carbide (e.g., SiC) nanorods with diameters of less than about 100 nm, typically between 2 and 40 nm, and aspect ratios of 10 to 1000. The volatile species source, carbon source, and supported metal catalyst can be used to produce carbide nanorods in single run, batch, and continuous reactors under relatively mild conditions. The method described herein employs a simple catalytic process involving readily available starting materials.

Although, the method discussed below focuses on the production of SiC, it can be used to prepare other carbide nanorods such as titanium carbide and nitride nanorods such as silicon nitride, $Si_3N_4$. The Examples described below are illustrative of the disclosed method; however, many alternatives, modifications and variations will be clear to those skilled in the art.

Synthesis of Nanorods

The nanorods disclosed herein are prepared by the reaction of carbon with a volatile species, generated by the volatile species source, at the surface of a metal catalyst particle. In general, the reaction is carried out under static conditions in a sealed quartz tube with the reaction temperature dictated by the gas-phase transport of components in the reaction mixture (see Examples 1–8). Alternatively, the reaction can be carried out in a continuous flow reactor. Reaction temperatures are generally between 500 and 2500° C., preferably between 600 and 1700° C., and most preferably between 900 and 1500° C. In general, the progress of the reaction can be monitored by measuring the conversion of carbon source to the carbide nanorod and the structure of the carbide nanorod.

The volatile species source has considerable volatility under the reaction conditions. Volatile species source (i.e., the source of the metal in the carbide nanorod) includes a pure metal or nonmetal in elemental form, a metal or nonmetal oxide, or an alkyl derivative of a metal (e.g., a silane). The volatile species source can also include a transport agent. Transport of the volatile species is generally enhanced by forming volatile complexes with the halogen transport molecules or transport agents. The transport agent is a halogen transport molecule (e.g., $I_2$, $Br_2$, $Cl_2$), a halogen transport agent (e.g., $TeCl_4$), or combinations thereof. Iodine is the most preferred halogen transport molecule for preparing carbide nanorods according to the methods described herein. In addition, the transport agent $TeCl_4$ forms volatile species with most nonvolatile oxides, including $MnO_2$ and $MoO_2$.

The carbon source provides carbon to the carbide nanorod. The carbon source includes carbon black, amorphous carbon, highly-oriented pyrolytic graphite, carbon-based polymers, fullerenes (i.e., $C_{60}$, $C_{70}$), or $C_1$ to $C_{20}$ hydrocarbons. The hydrocarbons can be branched or straight-chain hydrocarbons and can include unsaturated or aromatic groups.

The metal catalyst includes lithium, sodium, potassium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, a lanthanide series element, or a combination thereof. Preferred metal catalysts include $Co_{1-x}Mo_x$, $Ni_{1-x}Mo_x$, combinations of Mn, Fe, Co, Ni and Mo, $Mn_{1-x}Mo_x$, and alkali metals and salts of Mn, Fe, Co, Ni, and Mo. For the preparation of SiC nanorods, Fe/Mo catalysts are most preferred.

The metal catalyst is supported on a carrier. For example, a salt of the metal catalyst is coated on the surface of the carrier. In a preferred treatment, supported metal catalyst is placed in an alumina boat that is then placed at the center of a quartz tube within a horizontal tube furnace having hydrogen flowing through it. The metal catalyst is reduced upon heating. Preferably, the carrier is a high surface area substrate, such as a powder. The carrier is comprised of small particles (i.e., spheres having diameters less than 1000 Å, more preferably between 100 and 250 Å) that do not melt at the temperature of carbide nanorod growth (i.e., the carriers are refractory ceramic materials). The carrier is inert under the conditions of forming the supported catalyst and under the conditions of growing the carbide nanorods. Fumed alumina ($Al_2O_3$) is a preferred carrier. By supporting the metal catalyst on a high surface area substrate (e.g., fumed alumina ($Al_2O_3$)), small, nanometer scale metal catalyst particles form during growth of the carbide nanorods.

In general, the carbon source (e.g., graphite) reacts with the volatile species generated from the volatile species source, and a halogen transport molecule, such as $I_2$, $Br_2$, $Cl_2$, or a transport agent, such as $TeCl_4$, to form a binary carbide. Ternary carbides are formed from two corresponding volatile species sources, such as a pure metal, nonmetal or metal oxide, and a halogen transport molecule. Nitrogen can be included in the nanorod composition by including a nitrogen source such as $N_2$ or $NH_3$.

Some reactants are generated in situ, such as $B_2O_2$ which is generated in situ by heating elemental boron and $TiO_2$ powder. Specific examples of reagents include TiO, $B_2O_2$, $FeC_3$, and SiO. Additional examples and guidance are found in H. Schafer, *Angew. Chem. Int. Ed., Engl.* 10:43–50 (1971). Commercially-available reagents generally do not require pre-treatment before use, since their purity is typically greater than or equal to 99%. Commercial sources of reagents include Aldrich Chemicals, Milwaukee, Wis., and Johnson-Mathey (Alfa Aesar), Ward Hill, Mass.

The method can be used to prepare SiC nanorods. Suitable volatile silicon sources include $SiO_2$ (mixed with carbon), mixtures of $SiO_2$ and Si, Si, a siloxane polymer, or $SiR_mX_{4-m}$, where m is 0, 1, 2, or 3, R is hydrogen, alkyl, aryl, alkoxy, or alkyl amino, and X is Cl, Br, F, I, or H. The alkyl, aryl, alkoxy, or alkyl amino groups have twenty carbons or less and can be branched or unbranched. The alkyl amino group can be a monoalkyl or dialkyl amino group. Alternatively, the alkyl amino group can include an aryl substituent.

In one example for growth of SiC nanorods, the supported metal catalyst is a Mo/Fe mixture, with one preferred ratio being Mo:Fe equals 1:1 on a molar basis, although ratios of Fe:Mo can between 0:1 and 1:0, although more preferred values are between 10:1 and 1:10. The volatile silicon source is a combination of Si/SiO and iodine, and carbon powder is used as the carbon source. The reactants and supported metal catalyst are placed in a furnace tube and heated for several hours at a temperature between 900 and 1500° C., resulting in the formation of a high yield of SiC nanorods having typical diameters of between 2 and 40 nm and aspect ratios of 10 to 1000. All components of the process are readily available commercial items (of relatively low cost), and thus the process can be readily scaled from laboratory to commercial applications.

Without intending to be bound, SiC whiskers are believed to grow in the presence of the metal catalyst (e.g., Mo, Fe, Co, Ni) according to a catalytic vapor-liquid-solid (VLS) process. In the catalytic VLS process, a metal catalyst particle forms an alloy with one or more components of the product and serves as nucleation site for growth. The size of the metal catalyst particle determines the size of the resulting carbide article, since they are comparable. Under equilibrium conditions, the size of metal catalyst particles (i.e., a powder) have a minimum theoretical size on the order of one micron, thus explaining the dominant production of whiskers in the 1 micron to 100 micron diameter range when the metal catalysts are employed as a bulk reagent. See, for example, Qi, et al., U.S. Pat. No. 5,221,526. Neither experimental results nor theoretical considerations suggest that such agents represent a path for producing SiC nanorods.

In order to prepare carbide nanorods, it is necessary to limit the size of the metal catalyst particles to the nanometer size regime. By employing metal catalysts that are supported on a high surface area substrate (e.g., fumed alumina ($Al_2O_3$)), small, nanometer scale catalyst particles form that would not be stable otherwise. In addition, supported metal catalysts are readily adaptable to continuous flow reactors that can be used to produce large quantities of the desired nanorod materials.

SiC nanorod growth experiments using the Si-iodine reactant indicate that the greater volatility of silicon iodide complexes at low temperatures in comparison to SiO allow the reactions to be carried out in a more controlled manner. TEM analysis of a large number of samples prepared at 1200° C. show reproducibly the presence of SiC nanorods terminating with nearly spherical balls. The SiC nanorods had average diameters of about 16 nm. The ball-like catalyst particles had diameters between about 16 and 60 nm, with smaller diameters observed for shorter reaction times and larger diameters observed for longer reaction times. Without intending to be bound, it is believed that there is a critical catalyst size on the order of 10–20 nm required for SiC nanorod growth to initiate, and that the catalyst size can increase during growth via diffusion on the support or via vapor phase transport. Composition and structural analyses of the balls show that they contain primarily Mo and Si (e.g., $MoSi_2$). These observations suggest that a significant fraction of the SiC nanorods grow by a catalytic vapor-liquid-solid mechanism. These ball-like structures capping the SiC nanorods are very reminiscent of the structures observed previously in metal-catalyzed growth of SiC whiskers. It is important to note, however, that the diameters of the SiC nanorods and ball-like catalyst particles are orders of magnitude smaller than the micron-sized whiskers.

Properties of Nanorods

The properties of the carbide nanorods can be determined by, for example, transmission electron microscopy (TEM) to measure stacking fault density; energy-dispersive X-ray fluorescence (EDX) to measure the composition of the material; electron energy loss spectroscopy to measure the hybridization of carbon; powder X-ray diffraction (XRD) to measure the crystal lattice structure; and convergent beam electron diffraction to measure lattice symmetry or the lattice constant.

The tensile strength of the carbide nanorods can be measured using an atomic force microscope to apply known loads to a nanorod until it fractures or plastically deforms. The strength of the nanorods increases dramatically as the diameter is decreased. For example, a silicon carbide nanorod having a diameter of 17.6 nm had a strength of 32.9 GPa, while an even smaller silicon carbide nanorod having a diameter of 10.8 nm had a strength of 57.0 GPa. These strength values are between 150 and 500 percent greater than those observed for SiC whiskers.

The carbide nanorod products produced by the method of the invention have compositions that include carbon and another element derived from the volatile species. The other element includes titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, zinc, aluminum, copper, germanium, cadmium, indium, tin, lead, thallium, or combinations thereof. The composition of the nanorods can contain between 5 and 10 percent impurities such as oxygen, silicon, a halogen, or tellurium, or combinations thereof. The carbide nanorod can further include nitrogen, boron, or phosphorus. Most preferably, the carbide is SiC.

The ratio x of carbon to the other element in a binary carbide ($M^1C_x$) or a ternary carbide ($M^1M^2_yC_x$) is between 0.1 to 2.1. Where $M^1$ is Ti, Zr, or Hf, x is preferably between 0.5 and 1.1, and more preferably between 0.9 and 1.1 (i.e., stoichiometric). Where $M^1$ is V, Nb, or Ta, x is preferably between 0.7 and 2.1. Other preferred ratios are as follows: Mo and W (0.6–2.1); Cr and Mn (0.2–0.7); Tc, Re, and Os (0.7–1.1); Fe, Co, and Ni (0.2–0.5); lanthanide elements such as Gd, Dy, and Yb (0.5–1); and B (0.1–0.3). The value for y is between 0 and 0.9, i.e., y is 0 in binary carbides. Stoichiometric carbide nanorods can have enhanced conductivity and lower chemical reactivity, due to fewer carbon vacancies.

Choice of metal catalyst can be a determining factor in the structure or size of the carbide nanorods. For example, the crystal structure or diameter of the carbide nanorod, (i.e., amorphous, polycrystalline, or single-crystal) can be affected, in part, by the temperature, time of reaction, and choice of supported metal catalyst.

With regard to temperature, amorphous carbide materials are generally obtained at low reaction temperatures, e.g., below 500° C., or even below 1000° C. In contrast, polycrystalline materials are generally obtained under conditions when there is insufficient energy or time for the uncorrelated crystalline domains to rearrange into a single crystal structure. Temperatures required to produce polycrystalline materials are always higher than temperatures required to produce an amorphous phase of the same carbide. A polycrystalline material can rearrange into a single crystal material at temperatures sufficiently high to promote diffusion and atomic rearrangement. Similar results can be obtained by increasing the amount of time the material is held at an elevated temperature.

Single-crystal materials are generally obtained when nucleation of the carbide occurs at a single site (e.g., on the surface of a metal catalyst particle), and the growth of the carbide phase spreads outward from this single site. A single crystal carbide nanorod consists of a single domain which can have few defects (high quality single-crystal) or many defects (low quality single-crystal). While essentially straight nanorods are preferred, the invention also encompasses straight, helical, cross-linked, and networked geometries composed of one or more nanorods.

Uses of Nanorods

The carbide nanorods can be used in the preparation of nanostructures having a superior combination of a uniquely small size and mechanical, electrical or magnetic properties, suitable for electrodes in nanoscale batteries and for high density magnetic recording media. Small diameters and high aspect ratios also make the disclosed articles useful as improved reinforcements in metal, ceramic, and polymer matrix composites. A carbide nanorod can be selected from a wide range of carbides to suit the chemical properties (e.g., resistance, reactivity) or physical properties (e.g., coefficient of thermal expansion) desired for a particular composite. Specific products include cutting tools, engineering composites such as gas turbine blades and automotive ceramics, and implantable medical devices such as artificial limbs and joints. The carbide nanorods (e.g., silicon carbide) can be used as abrasives or to form wear-resistant surfaces. The nanorods can also be used as probe tips for manipulation (i.e., in force microscopy or biology). The nanorods are also useful as "defects" embedded within a superconductor to pin vortices in high-temperature, high critical current density superconductor wires (e.g. copper oxide), see P. Le Doussal and D. R. Nelson, *Physica C* 232:69–74 (1994); and P. Yang and C. M. Lieber, *Science* 273: 1836–1840 (1996). The nanorods can be used in basic research to probe the effects of confinement and dimensionality in metallic, semiconducting and superconducting materials.

Without further elaboration, it is believed that one skilled in the art can, based on the description herein, utilize the present invention to its fullest extent. All patents and publications cited herein are hereby incorporated by reference. The following specific examples are, therefore, to be construed as merely illustrative, and not limitative of the remainder of the disclosure.

Examples

In the following examples, four supported metal catalysts were prepared. These supported metal catalysts were used to prepare carbide nanorods as described in Examples 1–8.

Supported Metal Catalyst 1. A Fe/Mo supported metal catalyst was prepared in the following manner. First, 4.32 g (0.00107 mol) of ferric nitrate and 0.22 g (0.00067 mol) of molybdenum acetylacetonate were dissolved in 35 mL of methanol. The resulting solution was added to a paste prepared by suspending 4.40 g of fumed alumina (Degussa) in 35 mL of methanol. The mixture was stirred for 45 minutes, and was dried at 115° C. at reduced pressure ($5 \times 10^{-3}$ torr) for 2 hours. The resulting solid is the supported metal catalyst, and consists of the Fe/Mo catalyst mixture supported on the fumed alumina surface. Supported Metal Catalyst 1 is a fine reddish brown powder.

Reduced Supported Metal Catalyst 1. After being supported on the alumina surface, the supported metal catalyst was placed in an alumina boat, which was placed at the center of a quartz tube within a horizontal tube furnace. Under a flow of hydrogen gas (99.999+%, 90 sccm), the furnace and its contents were heated to 760° C. This temperature was maintained for about 45 minutes. The furnace was allowed to cool naturally to ambient temperature to yield Reduced Supported Metal Catalyst 1 as a fine, black powder.

Supported Metal Catalyst 2. In another example of the supported metal catalyst, 1.001 g of alumina, 0.5078 g of ferric nitrate nonahydrate and 0.4987 g of molybdenum acetylacetonate were combined in a manner analogous to that described in the preparation of Supported Metal Catalyst 1. Supported Metal Catalyst 2 was a fine reddish brown powder.

Supported Metal Catalyst 3. In another example of the supported metal catalyst, 0.9800 g of alumina and 0.9801 g of molybdenum acetylacetonate were combined in a manner analogous to that described in the preparation of Supported Metal Catalyst 1. In this case, 24 mL of methanol was used to dissolve incompletely the molybdenum acetylacetonate. The soluble material was added to the alumina. Supported Metal Catalyst 3 was a fine green powder.

Supported Metal Catalyst 4. In another example of the supported metal catalyst, 0.988 g of alumina and 0.950 g of ferric nitrate nonahydrate were combined in a manner analogous to that described in the preparation of Supported Metal Catalyst 1. Supported Metal Catalyst 4 was a fine orange powder.

Example 1

A mixture composed of 113 mg of SiO (Alfa Aesar 99.99%), 2.2 mg of iodine (Aldrich, 99.99%), and 7.9 mg of a graphite-supported metal catalyst mixture containing graphite (Johnson-Mathey, 300 mesh, 99.5% microcrystalline graphite powder) and having 7.2 weight percent Reduced Supported Metal Catalyst 1 was sealed in a quartz tube (8 mm OD×6 mm ID×50 mm length) at $1 \times 10^{-3}$ torr. The graphite-supported metal catalyst mixture was prepared by grinding the graphite powder (95.4 mg) with 7.4 mg of reduced supported metal catalyst to produce the mixture containing 7.2 weight percent reduced supported metal catalyst used above. The quartz tube containing SiO, the graphite-supported metal catalyst mixture, and iodine was placed in the center of a horizontal tube furnace. The furnace and its contents were heated for 1 hour at 1450° C. During heating, the black graphite-supported metal catalyst mixture converted to a grayish-blue product that consisted primarily of SiC nanorods. This procedure produced a high (>70%) yield of SiC nanorods.

TEM analysis of the products demonstrate that the SiC nanorods produced in this manner grow primarily along the <111> direction. The SiC nanorods were very straight and had diameters primarily between 2 and 50 nm. These Mo-Si spheres (e.g., $MoSi_2$) are believed to be one active metal catalyst responsible for the VLS growth of the SiC nanorods.

Example 2

A mixture composed of 26.9 mg of Si, 5.9 mg of iodine (Aldrich, 99.99%), and 4.8 mg of a graphite-supported metal catalyst mixture containing 7.2 weight percent Reduced Supported Metal Catalyst 1 was sealed in a quartz tube (8 mm OD×6 mm ID×50 mm length) at $1 \times 10^{-3}$ torr. The quartz tube containing the reactants was placed in the center of a horizontal tube furnace. The furnace and its contents were heated for 12 hours at 1200° C. During this reaction the black graphite/Reduced Supported Metal Catalyst 1 mixture converted to a grayish-blue product that consisted primarily of SiC nanorods. Electron diffraction and TEM imaging studies demonstrate that at least some of the catalyst spheres are the known solid phase $\beta$-$MoSi_2$. The nanorods were produced in high (>70%) yield by this procedure.

TEM analysis of the products demonstrated that the SiC nanorods produced in this manner grow primarily along the <111> direction. Spherical structures that contain primarily Mo and Si (from EDX analysis) were found at the ends of many of the nanorods.

Example 3

A mixture composed of 23.6 mg of Si, 4.8 mg of a fullerene-supported metal catalyst mixture containing 7.2 weight percent Reduced Supported Metal Catalyst 1, and 5.6 mg of iodine (Aldrich, 99.99%) was sealed in a quartz tube at $1 \times 10^{-3}$ torr. The fullerene-supported metal catalyst mixture was prepared by mixing $C_{70}$ fullerene (38.6 mg) with 3.0 mg of Reduced Supported Metal Catalyst 1. The quartz tube containing the reactants was placed in the center of a horizontal tube furnace and was heated for 12 hours at 1200° C. During heating, the black fullerene-supported metal catalyst mixture converted to a grayish-blue product that consisted primarily of SiC nanorods. The nanorods were produced in moderate (40–50%) yield by this procedure.

TEM analysis of the products demonstrate that the SiC nanorods produced in this manner grow primarily along the <111> direction. The SiC nanorods had diameters between 2 and 30 nm with a typical diameter of 10 nm. The SiC nanorod products were essentially the same as those obtained in Examples 1 and 2.

Example 4

A mixture composed of 26.0 mg of Si, 4.9 mg of a graphite-supported metal catalyst mixture containing 6.5 weight percent Reduced Supported Metal Catalyst 4 (which was produced in a manner analogous to that described for Reduced Supported Metal Catalyst 1), and 5.8 mg of iodine (Aldrich, 99.99%) was sealed in a quartz tube at $1 \times 10^{-3}$ torr. The quartz tube containing the reactants was placed in the center of a horizontal tube furnace which was heated for 12 hours at 1230° C. During heating, black graphite-supported metal catalyst mixture converted to a grayish-blue product that consisted primarily of SiC nanorods.

TEM analysis of the products demonstrate that the SiC nanorods produced in this manner grow primarily along the <111> direction. The SiC nanorods had diameters between 2 and 50 nm with typical diameters between 24 and 37 nm. The SiC nanorods prepared in this Example had a characteristic brick-like structure.

Example 5

A mixture composed of 83.4 mg of SiO, 3.7 mg of iodine (Aldrich, 99.99%), and 9.7 mg of a graphite-supported metal catalyst mixture containing 7.9 weight percent Reduced Iron Supported Metal Catalyst (which was produced by placing Supported Metal Catalyst 4 in an alumina boat at the center of a horizontal tube furnace, and then heating the catalyst under a flow or hydrogen gas (99.999+%, 90 sccm) at 760° C. for about 45 minutes) was sealed in a quartz tube at $1 \times 10^{-3}$ torr. The quartz tube containing the reactants was placed in the center of a horizontal tube furnace which was heated for 45 minutes at 1450° C. During heating, black graphite-supported metal catalyst mixture converted to a dark, fluffy, slightly grey powder.

TEM analysis showed a great deal of unreacted material. There was a low (10–30%) yield of SiC nanorods about 100 nm in diameter and exceeding 1 micron in length. The diameter of the nanorods in this Example tended to fluctuate. Fewer SiC nanorods were obtained having diameters between 20 and 30 nm. Some of the smaller diameter nanorods were not straight.

Example 6

A mixture composed of 43.0 mg of SiO and 7.0 mg of a graphite-supported metal catalyst mixture containing graphite and 8.3 weight percent Reduced Supported Metal Catalyst 1 was sealed in a quartz tube (8 mm OD×6mm ID×50 mm length) at $1\times10^{-3}$ torr. The quartz tube containing SiO, the graphite-supported metal catalyst mixture, and iodine was placed in the center of a horizontal tube furnace. The furnace and its contents were heated for 65 minutes at 1450° C. The product was a grayish powder. There were many SiC nanorods having diameters of between 10 and 30 nm and fewer having diameters in the 50 to 100 nm range. The 10 nm-diameter nanorods were most common. The SiC nanorods obtained in this Example tended to be long (e.g., greater than 10 microns) and curved, and were obtained in low to moderate yields.

Example 7

A mixture composed of 4.1 mg of Si powder, 4.5 mg of iodine, and 6.0 mg of a graphite-supported metal catalyst mixture containing 6.77 weight percent Reduced Molybdenum Supported Metal Catalyst (which was produced by placing Supported Metal Catalyst 3 in an alumina boat at the center of a horizontal tube furnace, and then heating the catalyst under a flow of hydrogen gas (99.999+% sccm) at 760° C. for about 45 minutes) was sealed in a quartz tube at $1\times10^{-3}$ torr. The quartz tube containing the reactants was placed in the center of a horizontal tube furnace which was heated for 12 hours at 1200° C. The product was a black-grey powder. SiC nanorods had diameters between 1 and 20 nm range and tended to have a zig-zag shape. The yield of nanorods was low, with much unreacted material remaining.

Example 8

A mixture of 5.4 mg of graphite and 3.3 mg of iodine was placed at one end of an 8 cm sealed quartz tube. Reduced Supported Metal Catalyst 1 (1.5 mg) was placed 5 cm from the graphite, and 9.2 mg of Si powder was placed at the end of the tube opposite the graphite. The quartz tube was sealed at $1\times10^{-3}$ torr. The tube was heated to 1200° C. for 700 minutes with the graphite end in the hot zone of the tube furnace.

The product was a mixture of black and bluish grey powders. TEM showed straight, smooth SiC nanorods as well as many of the brick-like SiC nanorods. The brick-like structure is typical of the nanorods grown from an iron only catalyst (see, e.g., Example 5). There were also straight SiC nanorods with diameters between 50 and 100 nm.

From the above description, the essential characteristics of the present invention can be ascertained. Without departing from the spirit and scope thereof, various changes and modifications of the invention can be made to adapt it to various usages and conditions. Thus, other embodiments are also within the claims.

What is claimed is:

1. A method of producing a carbide nanorod comprising:
   providing a volatile species source, a carbon source, and a carrier coated with a metal catalyst in a furnace, wherein the metal catalyst is a mixture of molybdenum and iron in a molar ratio of Mo:Fe between 99:1 and 1:99 and is supported on particles having diameters less than 1000 angstroms; and
   heating the volatile species source, the carbon source, and the supported metal catalyst to a temperature between 500° C. and 2500° C. for a sufficient time to form the carbide nanorod having an aspect ratio of between 10 and 1000 and a short axis of between 1 and 40 nanometers and including an element provided by the volatile species source and carbon provided by the carbon source, wherein
   the carbide includes titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, zinc, aluminum, copper, germanium, or a combination thereof.

2. The method of claim 1, wherein the volatile species source includes titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, nitrogen, boron, phosphorus, zinc, aluminum, copper, germanium, or a combination thereof.

3. The method of claim 2, wherein the carbon source includes carbon black, amorphous carbon, graphite, a carbon-based polymer, a fullerene, or a $C_1$ to $C_{20}$ hydrocarbon.

4. The method of claim 3, wherein the volatile species source includes titanium, silicon, niobium, iron, boron, tungsten, molybdenum, gadolinium, or a combination thereof.

5. The method of claim 4, wherein the volatile species source includes silicon.

6. The method of claim 5, wherein the volatile species source, the carbon source, and the supported metal catalyst are heated to a temperature between 900° C. and 1500° C.

7. The method of claim 3, further comprising flowing a gas through the furnace.

8. The method of claim 3, wherein the carbide further includes nitrogen, boron, or phosphorus.

9. A method of producing a carbide nanorod comprising:
   providing a volatile species source, a carbon source, and a supported metal catalyst in a furnace, wherein the metal catalyst is a mixture of molybdenum and iron in a molar ratio of Mo:Fe between 99:1 and 1:99 and is supported on particles having diameters less than 1000 angstroms; and
   heating the volatile species source, the carbon source, and the supported metal catalyst to a temperature between 500° C. and 2500° C. for a sufficient time to form the carbide nanorod having an aspect ratio of between 10 and 1000 and a short axis of between 1 and 40 nanometers and including an element provided by the volatile species source and carbon provided by the carbon source, wherein
   the carbide includes titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, zinc, aluminum, copper, germanium, or a combination thereof.

10. The method of claim 9, wherein the molar ratio of Mo:Fe is between about 10:1 and 1:10.

11. The method of claim 10, wherein the volatile species source further includes iodine.

12. The method of claim 10, wherein the volatile species source includes $SiO_2$, Si, a siloxane polymer, or $SiR_mX_{4-m}$ where m is 0, 1, 2, or 3, R is hydrogen, alkyl, aryl, alkoxy, or alkyl amino, and X is Cl, Br, F, I, or H.

13. The method of claim 10, wherein the carbon source is graphite.

14. The method of claim 10, wherein the supported metal catalyst and the carbon source are mixed together.

15. The method of claim 10, wherein the carrier is inert.

16. A method of producing a carbide nanorod comprising:

providing a volatile species source, a carbon source, and a supported metal catalyst in a furnace, wherein the metal source, the carbon source and the supported metal catalyst are sealed in a tube and the metal catalyst is supported on particles having diameters less than 1000 angstroms; and heating the volatile species source, the carbon source, and the supported metal catalyst to a temperature between 500° C. and 2500° C. for a sufficient time to form the carbide nanorod having an asDect ratio of between 10 and 1000 and a short axis of between 1 and 40 nanometers and including an element provided by the volatile species source and carbon provided by the carbon source, wherein the carbide includes titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, zinc, aluminum, copper, germanium, or a combination thereof.

17. The method of claim 16, wherein the tube is evacuated to a pressure of less than one atmosphere before sealing.

18. A method of producing silicon carbide nanorods comprising:

placing a volatile species source including silicon in a furnace;

providing a carbon source and a supported metal catalyst in the furnace, wherein the metal catalyst is a mixture of molybdenum and iron in a molar ratio of Mo:Fe between 99:1 and 1:99 and is supported on particles having diameters less than 1000 angstroms;

generating a vapor including silicon in the furnace by heating the metal source to a temperature between 500° C. and 2500° C. to form silicon carbide nanorods having an aspect ratio of between 10 and 1000 and a short axis of between 1 and 40 nanometers; and collecting the silicon carbide nanorods thus formed.

19. The method of claim 18, wherein the supported metal catalyst is a carrier coated with a metal catalyst.

20. The method of claim 19, wherein the carbon source includes carbon black, amorphous carbon, graphite, a carbon-based polymer, a fullerene, or a $C_1$ to $C_{20}$ hydrocarbon.

21. The method of claim 20, wherein the volatile species source, the carbon source, and the supported metal catalyst are heated to a temperature between 900° C. and 1500° C.

22. The method of claim 21, wherein the mixture of molybdenum and iron is in a molar ratio of Mo:Fe between about 10:1 and 1:10.

23. The method of claim 21, wherein the volatile species source further includes iodine.

24. The method of claim 21, wherein the supported metal catalyst and the carbon source are mixed together.

25. The method of claim 21, wherein the carrier is inert.

26. The method of claim 21, further comprising flowing a gas through the furnace.

27. The method of claim 23, wherein the volatile species source includes $SiC_2$, Si, a siloxane polymer, or $SiR_mX_{4-m}$ where m is 0, 1, 2, or 3, R is hydrogen, alkyl, aryl, alkoxy, or alkyl amino, and X is Cl, Br, F, I, or H.

28. The method of claim 27, wherein the carbon source is graphite.

29. A method of producing silicon carbide nanorods comprising:

placing a volatile species source including silicon in a furnace;

providing a carbon source and a supported metal catalyst in the furnace, wherein the volatile species source, the carbon source and the supported metal catalyst are sealed in a tube and the metal catalyst is supported on particles having diameters less than 1000 angstroms;

generating a vapor including silicon in the furnace by heating the metal source to a temperature between 500° C. and 2500° C. to form silicon carbide nanorods having an aspect ratio of between 10 and 1000 and a short axis of between 1 and 40 nanometers; and collecting the silicon carbide nanorods thus formed.

30. The method of claim 29, wherein the tube is evacuated to a pressure of less than one atmosphere before sealing.

31. A method of producing a carbide nanorod comprising:

providing a volatile species source, a carbon source, and a supported metal catalyst in a furnace, the supported metal catalyst including a mixture of molybdenum and iron in a molar ratio of Mo:Fe between 99:1 and 1:99; and heating the volatile species source, the carbon source, and the supported metal catalyst to a temperature between 500° C. and 2500° C. for a sufficient time to form the carbide nanorod having an aspect ratio of between 10 and 1000 and a short axis of between 1 and 40 nanometers and including an element provided by the volatile species source and carbon provided by the carbon source, wherein the carbide includes titanium, silicon, niobium, iron, boron, tungsten, molybdenum, zirconium, hafnium, vanadium, tantalum, chromium, manganese, technetium, rhenium, osmium, cobalt, nickel, a lanthanide series element, scandium, yttrium, lanthanum, zinc, aluminum, copper, germanium, or a combination thereof.

32. The method of claim 31, wherein the molar ratio of Mo:Fe is between about 10:1 and 1:10.

33. The method of claim 31, wherein the volatile species source further includes iodine.

34. The method of claim 31, wherein the volatile species source includes $SiO_2$, Si, a siloxane polymer, or $SiR_mX_{4-m}$ where m is 0, 1, 2, or 3, R is hydrogen, alkyl, aryl, alkoxy, or alkyl amino, and X is Cl, Br, F, I, or H.

35. The method of claim 31, wherein the carbon source is graphite.

36. The method of claim 31, wherein the supported metal catalyst and the carbon source are mixed together.

37. The method of claim 31, wherein the carrier is inert.

38. A method of producing silicon carbide nanorods comprising:

placing a volatile species source including silicon in a furnace;

providing a carbon source and a supported metal catalyst in the furnace, the supported metal catalyst including a mixture of molybdenum and iron in a molar ratio of Mo:Fe between 99:1 and 1:99;

generating a vapor including silicon in the furnace by heating the metal source to a temperature between 500° C. and 2500° C. to form silicon carbide nanorods; and collecting the silicon carbide nanorods thus formed.

39. The method of claim 38, wherein the molar ratio of Mo:Fe is between about 10:1 and 1:10.

40. The method of claim 38, wherein the providing step includes placing the volatile species source, the carbon source and the supported metal catalyst in a tube and sealing the tube.

41. The method of claim 40, wherein the tube is evacuated to a pressure of less than one atmosphere before sealing.

* * * * *